United States Patent [19]

Berman et al.

[11] 4,331,251
[45] May 25, 1982

[54] COMPACT, LIGHTWEIGHT PRESSURE COOKER

[75] Inventors: Stanley J. Berman, 4148 Old San Jose Rd., Santa Cruz, Calif. 95065; Judith M. Berman, Santa Cruz, Calif.; Heiko T. deMan, Gualala, Calif.

[73] Assignee: Stanley J. Berman, Santa Cruz, Calif.

[21] Appl. No.: 217,829

[22] Filed: Dec. 18, 1980

[51] Int. Cl.³ .................. A47J 27/08; B65D 45/32; B65D 25/28
[52] U.S. Cl. ............................... 220/4 B; 126/388; 126/375; 220/319; 220/320; 220/94 R
[58] Field of Search ............... 220/4 B, 319, 320, 321, 220/94 R; 126/388, 373, 375, 390

[56] References Cited

U.S. PATENT DOCUMENTS

| | | | |
|---|---|---|---|
| 866,409 | 9/1907 | Vogler | 220/4 B |
| 1,482,049 | 1/1924 | Swanson | 220/321 |
| 1,681,150 | 8/1928 | Vischer | 220/320 |
| 2,301,724 | 10/1942 | Vishes | 126/388 |
| 2,404,777 | 7/1946 | Gaines | 220/320 |
| 3,029,724 | 4/1962 | Lee | 220/320 |
| 3,813,003 | 5/1974 | Bernazzani | 220/94 R |

FOREIGN PATENT DOCUMENTS

| | | | |
|---|---|---|---|
| 2722675 | 11/1978 | Fed. Rep. of Germany | 220/319 |
| 1080768 | 8/1967 | United Kingdom | 220/4 B |

*Primary Examiner*—George E. Lowrance
*Attorney, Agent, or Firm*—Kenneth R. Glaser

[57] ABSTRACT

A compact, lightweight pressure cooker which is particularly well-suited for backpacking and camping is disclosed. The pressure cooker assembly features two complementary mating pan sections which permit nestable, stacked engagement of one pan section within the other when disassembled. Each pan section has an annular, flanged rim which permits mutually superposed mating engagement when assembled. The pan sections are held together by clasp fasteners which are movable from a retracted, closed position of latching engagement with the assembled flanged rims to an open position in which the flanged rims are released, thereby permitting disengagement and separation of the pan sections. A curved handle is pivotally attached to each clasp and is movable from a retracted position in which the handle engages the clasp to an extended position in which both handles may be grasped and held together with one hand. An annular gasket is compressively confined between the flanged rims, and a pressure relief valve vents the cooking chamber when the cooking pressure exceeds a predetermined level.

8 Claims, 6 Drawing Figures

U.S. Patent  May 25, 1982  4,331,251
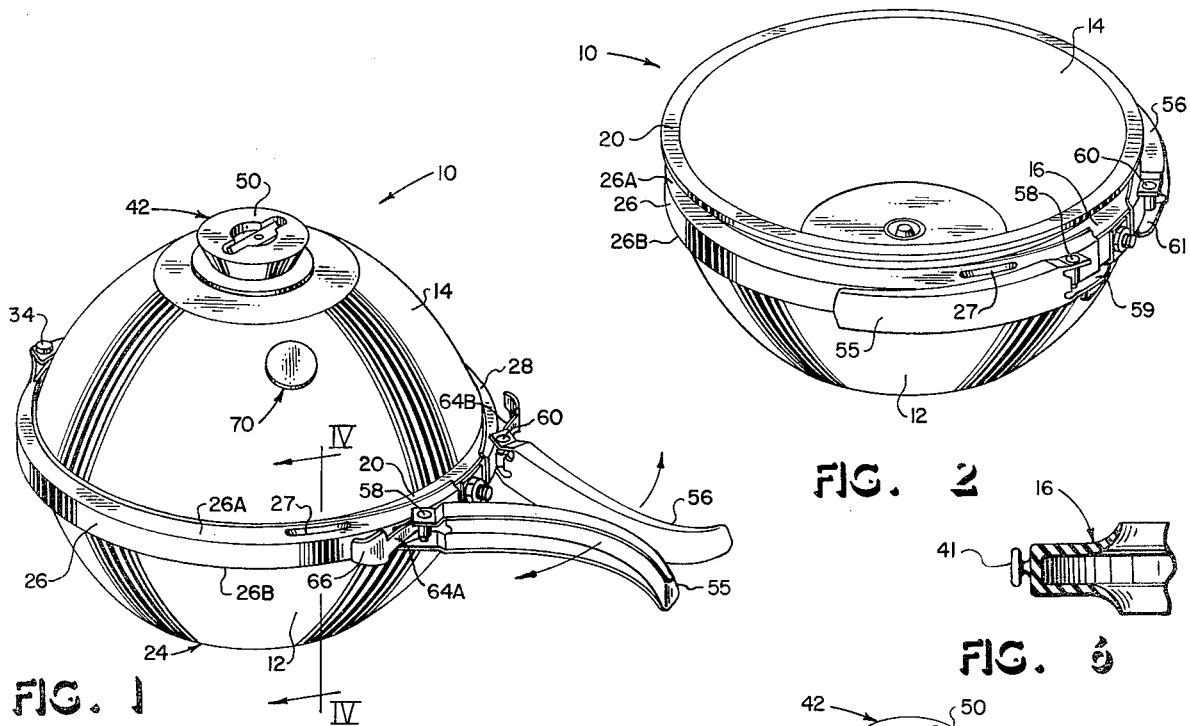
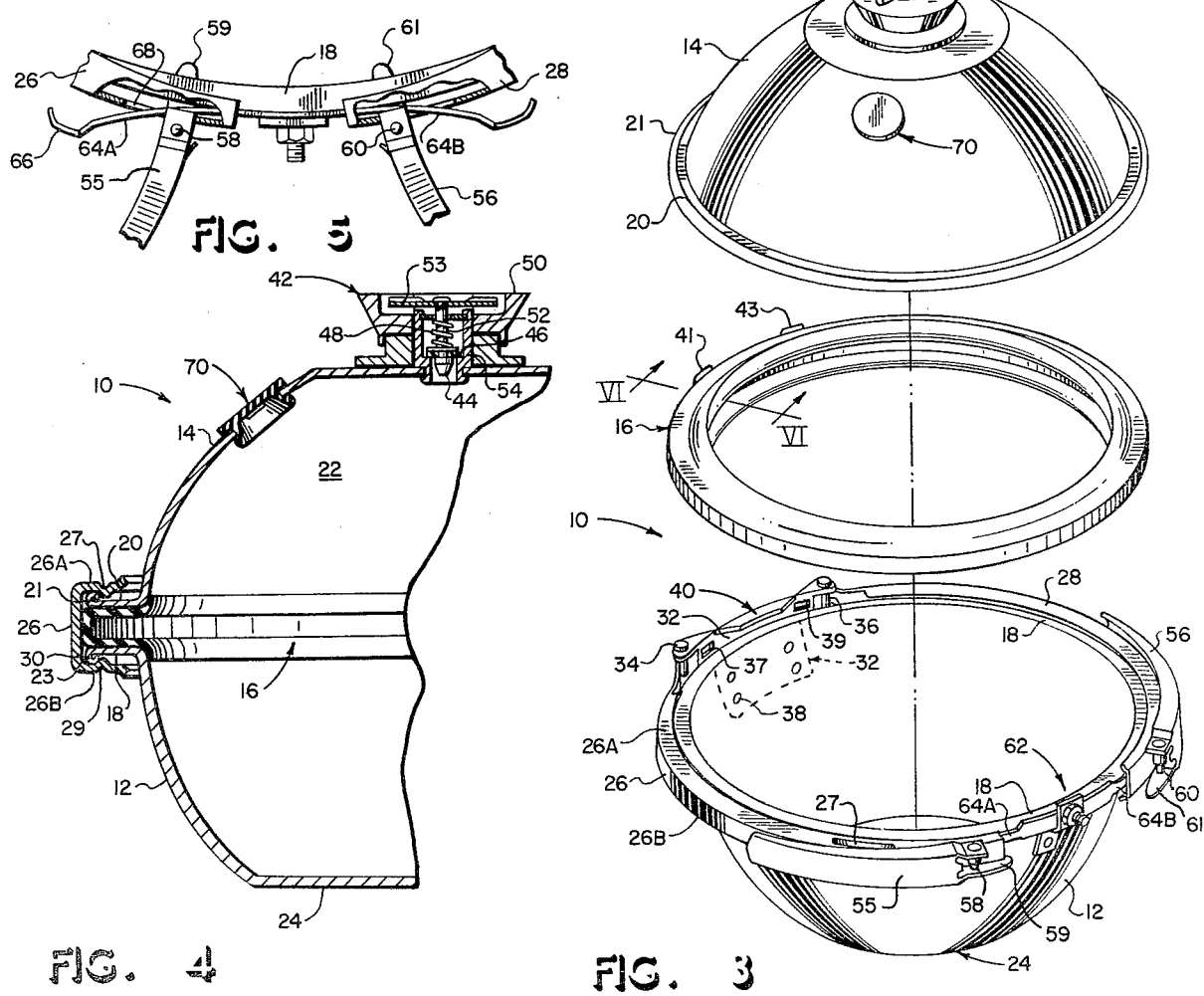

COMPACT, LIGHTWEIGHT PRESSURE COOKER

BACKGROUND OF THE INVENTION

1. Field of the Invention:

The present invention relates to new and useful improvements in pressure cookers, and more particularly to a compact, lightweight pressure cooker assembly which is especially well-suited for backpacking and camping purposes.

2. Description of the Prior Art:

In the course of recreational activities such as hiking, backpacking and mountain climbing in which outdoor camping is anticipated, only minimum equipment required for personal needs will be carried. One of the most common utensils carried for such purposes is the open skillet. The open skillet is well-suited for food preparation at sea level or relatively low elevation field conditions. However, when used at higher elevations, for example in the mountains, longer cooking times are required because of the lower ambient pressure at the higher elevation, and correspondingly more fuel and longer cooking times are required to provide fully cooked food. Additionally, most backpacking recipes are designed for cooking at sea level conditions, and the cooking time specified for such recipes must be modified according to an altitude chart to ensure that the food is cooked properly.

A cooking technique which is ideally suited for high altitude cooking is cooking under pressure, that is, within a pressure vessel. Besides being a fuel and time saver, pressure cooking locks vitamins into fresh foods and cooks vegetables to a tenderness not possible in regular cooking. Additionally, cooking under pressure allows the food contents to reach higher than boiling temperatures, for example 228° F. at five pounds, 240° F. at ten pounds, 250° F. at fifteen pounds, thereby destroying tough bacteria spores in low acid foods.

A variety of pressure cooking equipment is available, especially for home use for the preservation of fresh foods. This equipment is generally constructed of heavy gauge aluminum and usually is quite large in order to accommodate several canning jars. Because of its size and weight, such equipment is entirely unsuitable for backpacking purposes.

SUMMARY OF OBJECTS OF THE INVENTION

It is, therefore, the principal object of the present invention to provide a compact, lightweight pressure cooking assembly which is especially well-suited for backpacking, hiking, mountain climbing and other camping activities.

A related object of the invention is to provide a portable pressure cooking assembly which can be disassembled and rearranged into a minimum size transport configuration, but which can be quickly reassembled in the field for cooking purposes without the use of special tools.

Yet another object of the invention is the provision of a compact, lightweight pressure cooking assembly which is easily sealed in the field for cooking food under pressure, and which includes a pressure relief valve which can be adjusted for one atmosphere pressure whereby food can be cooked at least at an equivalent of sea level pressure at any altitude.

A further object of the invention is the provision of an effective pressure seal for compact, lightweight pressure cooking equipment.

SUMMARY OF THE INVENTION

The foregoing objects are achieved in the present invention by a compact, lightweight pressure cooker assembly which includes upper and lower pan members each having mutually conforming surface portions which permit nestable, stacked engagement of one pan member within the other when disassembled, thereby reducing the amount of space it occupies during transport. Each pan member includes an annular, flanged rim which permits mutually superposed mating engagement of one pan to the other when assembled, thereby enclosing a cooking chamber. The cooking chamber is sealed by an annular gasket which is compressively confined between the superposed rim portions. A pressure relief valve communicates with the cooking chamber for venting the chamber when the cooking pressure exceeds a predetermined level, for example 15 psi.

The pan members are held in sealed engagement with the annular gasket by first and second clasp members which are coupled in hinged engagement to the lower pan member for pivotal movement from a closed position of latching engagement, to an open position which permits separation of the pan members. In a preferred embodiment, each clasp has edge portions defining a channel in which the flanged rims are received in gripping engagement as the clasp members are moved toward the retracted position. The clasp members are locked in the retracted, sealed position by frictional engagement of the clasp channel portions with the superposed flanged rims in combination with the reaction forces produced by compression of the resilient gasket. Handles are pivotally coupled to the clasp members and are movable to an extended position wherein they may be grasped and held together with one hand thereby permitting the cooker to be moved about when in use without disturbing the sealed engagement of the clasp members.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawing.

BRIEF DESCRIPTION OF THE DRAWING

FIG. 1 is a perspective view of a compact, lightweight pressure cooker shown assembled and ready for use;

FIG. 2 is a perspective view of the pressure cooker of FIG. 1 shown disassembled and ready for transport;

FIG. 3 is an exploded perspective view of the pressure cooker assembly of the invention;

FIG. 4 is a sectional view taken along the lines IV—IV of FIG. 1;

FIG. 5 is a partial view, in perspective, of the clasp retainer assembly of the invention; and FIG. 6 is a sectional view taken along the lines VI—VI of FIG. 3.

DETAILED DESCRIPTION OF THE PREFERRED EMBODIMENTS

In the description which follows, like parts are marked throughout the specification and drawing with the same reference numerals, respectively. The drawing figures are not necessarily to scale and in some instances portions have been exaggerated in order to more clearly depict certain features of the invention.

Referring now to FIGS. 1 and 3 of the drawing, a compact, lightweight pressure cooker assembly 10 includes a lower pan member 12, an upper pan member or lid 14, and an annular gasket 16 which is confined between the lower and upper pan members. The lower and upper pan members each have mutually conforming surface portions permitting nestable, stacked engagement of one within the other when disassembled as shown in FIG. 2. Each pan member also includes annular, flanged rims 18, 20, respectively, permitting mutually superposed mating engagement with each other when assembled thereby enclosing a cooking chamber 22. The flanged rims 18, 20 are terminated by rolled lips 21, 23, respectively, for locking purposes. Each pan member preferably comprises a hollow spherical section, with the upper pan member 14 constituting a lid section and the lower pan section 12 constituting a bottom vessel having a heat transfer surface 24. As can best be seen in FIG. 4, the heat transfer surface 24 is relatively flat thereby providing a stable surface for resting engagement upon a stove or campfire grate.

Referring now to FIGS. 1 and 4, the assembled lower and upper pan members 12, 14 are held in compressive engagement with the annular gasket 16 by a pair of clasps 26, 28. Each clasp has edge flanges 26A, 26B and 28A, 28B, each flange pair defining a channel 30 for receiving and confining the superposed flanged rims 18, 20. Small dimples or depressions 27, 29 formed in the clasp edge flanges engage and interlock with the rolled lips 21, 23, respectively. The separation of the top and lower edges of each channel 30 is such that the superposed rim members 18, 20 are driven into compressive engagement with the resilient gasket 16 as the clasps are moved to the fully retracted, latched position as shown in FIG. 4. Both clasp members 26, 28 are coupled in hinged engagement to the lower pan member 12 by means of a hinge support plate 32 on which a pair of hinge pins 34, 36 are mounted. Each clasp member is movable from the retracted, closed position of latching engagement as shown in FIG. 4 to an open extended position. In the open extended position, the clasps may be pulled apart to permit separation of the lower and upper pan members as illustrated in FIG. 3.

Referring to FIGS. 3 and 6, a pair of square openings 37, 39 are formed in the hinge plate 32 for receiving buttons 41, 43, respectively, carried by the sealing gasket 16. The buttons 41, 43 interlock with the openings, thereby securing the gasket 16 to the lower pan 12 to prevent loss thereof. The gasket 16 is, however, easily removable for cleaning purposes.

Referring again to FIG. 3, the hinge support plate 32 is preferably mounted on the exterior side surface of the lower pan member 12 and is rigidly attached by means of rivets 38 which project through the lower pan sidewall. Additionally, the hinge support plate includes a radially inwardly projecting flange 40 which in combination with the annular rim 20 defines a fixed retaining channel for confining the annular seal 16 and compressing the same with the superposed rim 20 of the upper pan member 14.

According to an important feature of the invention, a pressure relief assembly 42 is connected in communication with the cooking chamber 22 for venting the chamber when the cooking pressure exceeds a predetermined level. The pressure relief assembly is preferably set for one atmosphere above ambient pressure so that food can be cooked at least at an equivalent of sea level pressure at any altitude. The pressure relief assembly 42 comprises a check valve element 44 which is biased into sealing engagement with a valve seat 46 by means of a compression spring 48.

The valve assembly 42 is equipped with a selector knob 50 which is coupled to the check valve element 44 through a valve stem 52 and latch 53. The valve stem and compression spring are confined within a retainer sleeve 54. The latch 53 is movable to a first detent position by rotating valve assembly 42 which lifts the check valve element from its seat for venting the cooking chamber continuously to atmospheric pressure. The selector knob 50 is movable to a second detent position in which the bias force of the spring 48 is applied to the check valve element 44. The retainer sleeve 54 preferably includes a castellated top which causes the valve to lift when the knob is turned. The compression spring 48 is particularly selected to have rate, length and load/deflection characteristics which enable it to open when the internal pressure developed within the cooking chamber 22 rises above a predetermined level, e.g. 15 psia.

According to an important feature of the invention, first and second handle members 55, 56 are coupled in hinged engagement to the clasp members 26, 28, respectively. The handle members 55, 56 are movable from an extended position as shown in FIG. 1 in which both handles may be grasped and held together with one hand to a retracted position, as shown in FIG. 3, in which the handles engage the clasps. The handles are pivotally mounted on hinge pins 58, 60 mounted on the end portions of the clasps 26, 28, respectively.

In the fully retracted position as shown in FIG. 3, the handles may be used to apply a sealing force against the clasps 26, 28 in opposing circumferential directions to cause the superposed flanged rim members 18, 20 to be forced into compressive engagement against the resilient gasket 16, and to be fully received within the channel 30. The handle members and the clasp members each preferably have mutually conforming surface portions permitting nestable retraction of the handle members around the clasp members as shown in FIGS. 2 and 3.

The handle levers 55, 56 are each provided with cam projections 59, 61 on the lower flange only. These cams engage detents (not illustrated) in the lower pan 12 as the handles are rotated to the fully extended position (FIG. 1). This arrangement helps to overcome resistance to opening and closing caused by the sliding interference engagement of the handle depressions 28, 29 with the rolled rims 21, 23, respectively.

Referring again to FIG. 3, a clasp retainer assembly 62 is riveted to the exterior side surface of the lower pan member 12 and includes a resilient latch member 64 having opposite tang portions 64A, 64B which are coupled in sliding engagement with the corresponding clasp members 26, 28, respectively. As can best be seen in FIG. 5, each tang member is terminated at one end by a catch 66 with an intermediate portion of the tang member extending through a cutout opening 68 formed in the end of each clasp. The latch assembly 64 maintains the orientation of the clasp members with respect to the rim 20, and the tang members 64A, 64B serve to guide the clasps 26, 28 as they are moved into the fully retracted position of sealed engagement. Additionally, the frictional forces developed by the engagement of the resilient tang members with the clasps further strengthens the sealed engagement.

The handles 55, 56 are preferably coated with a layer of thermally insulating material. The lower and upper pan members 12, 14 are preferably constructed from a lightweight, high strength material such as aluminum. The gasket 16 is preferably constructed of a high temperature resilient material such as silicon rubber having a durometer in the range of 30-40.

In the event of failure of the pressure relief assembly 42, a safety plug 70 carried by the upper pan member 14 is designed to blow out at 20 psi-25 psi. The safety plug 70 is preferably injection molded of the same material as the gasket 16.

It will be apparent from the foregoing description of a preferred embodiment that the pressure cooker of the invention can be easily disassembled and carried in the usual backpacking equipment to mountainous areas and assembled for quick processing of food where a pressure cooker has distinct advantages. The pressure cooker not only aids in the rapid preparation of the usual backpacking recipes, but also conserves fuel and energy necessary for high altitude cooking. When the primary cooking process is completed, the cooker can be used as an eating utensil and further serves as a container for other purposes useful in camping. Its lightweight, versatility, compactness, and fuel efficiency are distinct advantages over conventional portable cooking equipment and make it especially well-suited for backpacking, hiking, mountain climbing and other camping activities.

Although a preferred embodiment of the invention has been described in detail, it should be understood that various changes, substitutions and alterations can be made therein without departing from the spirit and scope of the invention as defined by the appended claims.

What is claimed is:

1. A compact, lightweight pressure cooker assembly comprising, in combination:

first and second pan members each having mutually conforming surface portions permitting nestable, stacked engagement of one pan member within the other when disassembled, and each pan member having an annular, flanged rim permitting mutually superposed mating engagement with each other when assembled thereby enclosing a cooking chamber;

first and second clasp members coupled in hinged engagement to one of said pan members for pivotal movement, each clasp member having edge portions defining a channel for receiving and confining the superposed flanged rims, and said clasp members being movable from a retracted, closed position of latching engagement with said superposed pan members in which said flanged rims are received within the channels in gripping engagement by said clasps, to an open extended position in which said rims are released, thereby permitting disengagement of the flanged rims and separation of said pan members;

first and second handle members pivotally coupled to said first and second clasp members, respectively, said handle members being movable from an extended position relative to said clasps in which both handles may be grasped and held together with one hand to a retracted position in which said handles engage said clasps;

an annular gasket compressively confined between the superposed rim portions defining a fluid seal; and, a pressure relief valve communicating with the cooking chamber for venting said chamber when the cooking pressure exceeds a predetermined level.

2. The compact pressure cooker assembly as defined in claim 1, wherein each pan member comprises a hollow spherical section, one of said spherical pan sections constituting a bottom having a heat transfer surface, and the other spherical pan section constituting a lid, said pressure relief valve being mounted on said lid section.

3. The pressure cooker assembly as defined in claim 2, said bottom pan section having a relatively flat heat transfer surface for stable resting engagement on a heat source.

4. The compact pressure cooker assembly as defined in claim 1, said clasp members and said flanged rims each having mutually conforming surface portions permitting nestable engagement of the superposed flanged rims within the channels of said clasps.

5. The compact pressure cooker assembly as defined in claim 1, including a layer of thermally insulating material covering each handle member.

6. The compact pressure cooker assembly as defined in claim 1, including a hinge support plate secured to one of said pan members, said hinge support plate having a radially inwardly projecting flange defining a fixed retaining channel for confining said annular seal and said superposed rim of said second pan member.

7. The compact pressure cooker assembly as defined in claim 1, said handle members each having edge portions defining a channel for receiving said first and second clasp members, respectively, said handle members and said clasp members having mutually conforming surface portions permitting nestable retraction of the handle members around the clasp members.

8. The compact pressure cooker assembly as defined in claim 1, including a clasp retainer assembly secured to one of said pan members, said clasp retainer plate having a resilient tang member coupled in sliding engagement with the corresponding clasp member.

* * * * *